No. 791,084. Patented May 30, 1905.

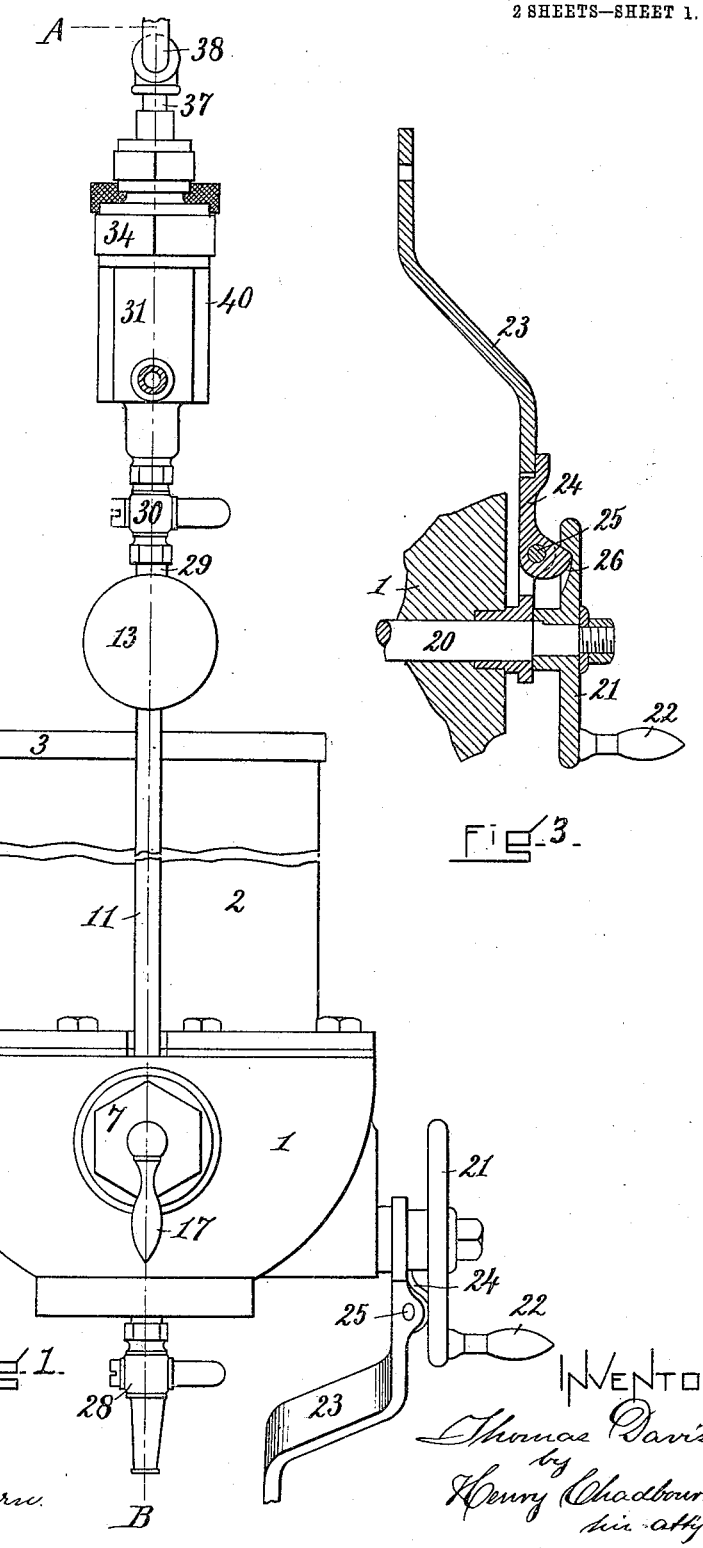

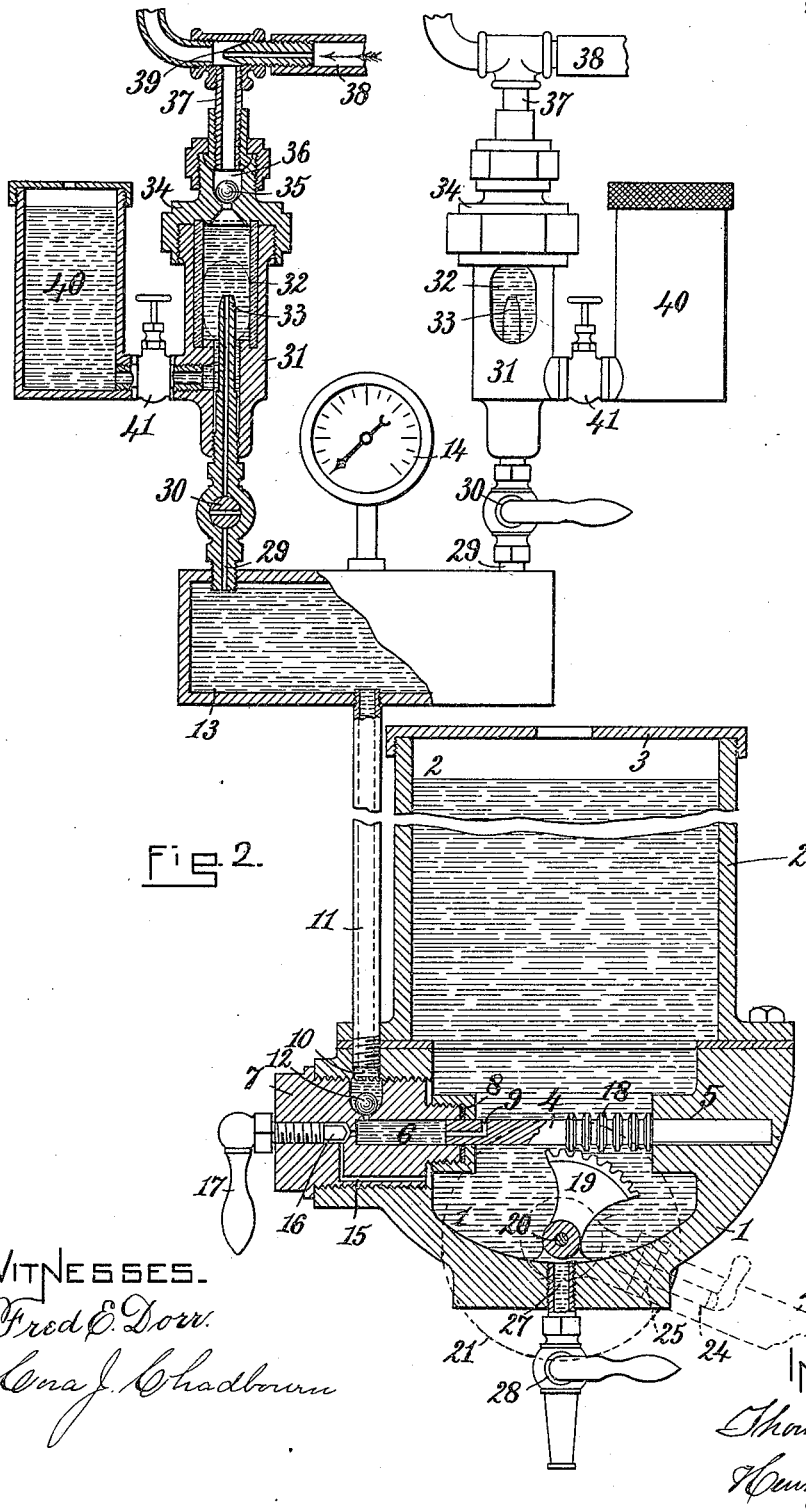

UNITED STATES PATENT OFFICE.

THOMAS DAVIS, OF BOSTON, MASSACHUSETTS.

LUBRICATOR.

SPECIFICATION forming part of Letters Patent No. 791,084, dated May 30, 1905.

Application filed May 6, 1903. Serial No. 155,934.

*To all whom it may concern:*

Be it known that I, THOMAS DAVIS, of Boston, in the county of Suffolk and State of Massachusetts, have invented certain new and useful Improvements in Lubricators, of which the following is a specification.

This invention relates to improvements in lubricators such as are used to lubricate the steam prior to its entering the cylinder of an engine and for similar purposes in which it is desired to force oil or other liquid lubricant into a chamber against a pressure within said chamber and in which a pump is used to force the lubricant into said chamber.

It has for its object to provide a pump which will force or handle a constant amount of the lubricant at each stroke of the pump, but whereby any desired portion of the lubricant thus forced by the pump may be utilized; to provide means whereby the portion of the lubricant pumped and used may be regulated; to provide means whereby any desired number of devices may be supplied with the lubricant by the same pump and the amount supplied to each device may vary, if so desired, and to otherwise improve lubricators of this class, as will be described hereinafter and claimed.

The invention is carried out substantially as illustrated on the accompanying drawings, which form an essential part of this specification, and whereon like characters of reference refer to like parts wherever they occur on the different parts of the drawings.

On the drawings, Figure 1 represents a side elevation of the lubricator, a portion of the upper part of the device being removed. Fig. 2 represents a longitudinal section on the line A B in Fig. 1. Fig. 3 represents a detail sectional view of the preferred device used whereby the lubricator may be operated by hand or by power, as desired.

Heretofore it has usually been the practice to provide a reservoir containing a supply of lubricant with as many pumps of different capacities as there are different amounts of the lubricant to be fed or supplied from said reservoir, or to provide means whereby the amount forced by each operation of each pump may be adjusted or regulated independent of the others. Such constructions or arrangements, although operating satisfactorily, made the devices very complicated and clumsy on account of the numbers of levers, connecting-links, and other parts used in the construction of such devices. It has also been the usual practice to introduce the oil or other lubricant into the steam within the steam-chest of an engine by drops or small quantities at a time, according to the quantity which would be carried along by the flow of the steam; but such quantities have not been sufficiently small and have not been applied to the steam in such a manner as to have the mass of the lubricant sufficiently broken up to permeate the entire body of the steam therewith. On this account and on account of the heavy or thick nature of the lubricant it has been found that a considerable quantity of the lubricant has failed to be carried with the steam into the cylinders and other parts of the engine, but has fallen through the mass of steam within the steam-chest and rested upon the lower surface thereof and in any crevice where it would be liable to collect.

As above stated, it is the principal object of my invention to simplify the construction and necessary adjustments of multiple-feed lubricators; but it is also the object and a very essential feature in my invention to provide means whereby the quantity of the lubricant fed may be broken up into very small particles and be so thoroughly mixed with the steam that the steam will be permeated with the lubricant and will hold the lubricant, so as to carry it into and through the cylinder, thus more fully accomplishing the object desired by the introduction of the lubricant into the steam.

My improved lubricator has a supply-reservoir in which a quantity of the oil or other lubricant is kept. This reservoir for convenience of construction has been shown as consisting of a base portion 1, which is substantially hemispherical and hollow, and said reservoir also consists of a hollow cylindrical portion 2, bolted or otherwise firmly secured on the flat upper side of the base portion. This reservoir is provided with a cover 3 of any desired shape, but sufficiently open to admit air to take the place of the lubricant as the lubricant is used from said reservoir. Within the base portion 1 is a horizontally-arranged plunger 4, one end of which is guided within a cylindrical recess 5 in the shell of the base portion 1, and which end of the plunger is preferably flattened on one side to allow of the free reciprocation of the plunger within said recess. The opposite end of the plunger 4 enters a cylindrical recess 6 within the inner end of a screw-threaded plug 7, inserted within a screw-threaded perforation in the shell of the base portion. The end of the plug 7 within the reservoir is provided with a stuffing box or gland 8, surrounding the plunger and forming a tight joint at this place for a purpose to be understood by the complete description of the device herein contained.

A passage 9 is formed within that end of the plunger 4 which reciprocates within the recess 6, and this passage forms communication between the recess 6 and the interior of the supply-reservoir when the plunger is in the position shown in Fig. 2 on the drawings, thus allowing the lubricant from the reservoir to freely enter the recess 6 when the plunger is in that position. A passage 10 through the plug 7 and through the base portion 1 forms communication between the inner end of the recess 6 and a pipe or tube 11, and this passage is controlled by a check-valve 12, which has been shown on the drawings as a ball-valve. The position of the opening to the passage 9 in the side of the plunger is such that said opening is covered by the walls of the recess 6 during a portion of the movement of the plunger, which is reciprocated by the mechanism to be described hereinafter. It will thus be seen that the location of the opening of the passage 9 on the side of the plunger in combination with the wall of the recess 6 forms a means whereby communication is cut off between the recess and the interior of the reservoir during a portion of the reciprocating movement of the plunger and that when this communication is thus cut off any oil or other lubricant which is within the recess 6 will be forced from said recess and into the passage 10 and tube 11 by the further movement of the plunger toward the inner end of the recess 6. Thus the recess 6 and the plunger 4 form a pump by which the lubricant is forced from the interior of the reservoir to the tube 11, and it will be seen that the valve 12 prevents the return of the lubricant from the tube 11 when the plunger is moved outward in the recess 6.

The tube 11 communicates with a storage-receptacle or drum 13, and it will be seen that the forcing of the lubricant into the tube 11 by the pump, as above described, tends to keep this receptacle filled with the lubricant under pressure, the amount of which pressure may be determined by a suitable gage 14 upon said receptacle. As the lubricant is practically incompressible and as the pump is given a uniform amount of reciprocation, as hereinafter described, it will be necessary that there should be a relief device provided whereby any tendency to create an excess pressure by the pump would be relieved, and this relief device I construct substantially as follows: A passage 15 within the plug 7 forms communication between the inner end of the recess 6 or pump-cylinder and the interior of the supply-reservoir, and it will be seen that any surplus lubricant may be returned to the reservoir through this passage 15 by the action of the plunger. In order to control this relief-passage 15, and thus control the pressure maintained upon the lubricant within the storage-receptacle, I provide the passage 15 with a valve 16, which is operated by a handle 17 outside the outer end of the plug 7, and which valve contracts the passage 15 more or less, as desired.

The mechanism used in my improved lubricator to reciprocate the plunger 4, and thus force the lubricant into the storage-receptacle 13, as above described, is constructed substantially as follows: The plunger 4 is provided with ring-shaped projections forming an annular rack 18 upon the plunger, into which the teeth of a sector-gear 19 mesh. This sector-gear is located within the supply-reservoir and is firmly mounted upon the end of a shaft 20, which projects through and has its bearing within the shell of the base portion 1 of the supply-reservoir. Upon the outer end of the shaft 20 is firmly mounted the wheel or circular disk 21, provided with a handle 22, by which the shaft 20 may be rocked within its bearings, and through the sector-gear 19 and rack 18 the plunger may be reciprocated. Loosely mounted upon the shaft 20 is a lever 23, the outer end of which may be connected to any suitable moving part of the engine, as is commonly done with the operating-lever of the oil-feed pumps now in common use, and whereby the lever 23 will be oscillated upon the shaft. A pawl 24 is pivotally mounted at 25 upon the lever 23 in such a manner that the end of said pawl may be caused to enter a recess 26 upon the back of the disk 21 or be withdrawn from said recess, according to the position of the pawl and substantially as illustrated in Fig. 3 of the drawings. When the pawl is in the position shown in Fig. 3 and its end is inserted within the recess in the disk, it will be seen that the oscillations of the lever 23 by the action of the engine will cause a rocking of the shaft within its bearing, and thereby operate the pump to force the lubricant into the storage-receptacle 13, as above described. Thus the pump may be operated by hand or by power, as is desired.

In order to be able to withdraw the lubricant from the reservoir whenever it is desired to do so, I provide the base portion 1 of the reservoir with a passage 27, controlled by a valve 28.

One or more discharge-passages 29 are provided for lubricant from the storage-receptacle 13 and through which the lubricant may be forced in its passage to the parts to be lubricated. Each discharge-passage is provided with a valve 30, by which it may be controlled, and also with a sight-feed, through which the lubricant passes, and by which means a person may see the rapidity with which the lubricant is being fed. These sight-feeds consist of a casing 31, provided with a transparent portion 32 on opposite sides thereof, by means of which a person may see entirely through the casing. Within this casing is a nozzle 33, through which the lubricant passes when entering the chamber within the casing of the sight-feed. The chamber within the sight-feed is filled with water, so as to cause the lubricant discharged from the nozzle 33 to assume the forms of drops and rise up through the water. The casing 31 of the sight-feed is provided with a removable cap 34, within which is located a check-valve 35, which will admit of the free passage of the lubricant from the casing through the passage 36 in the cap and to a pipe or tube 37 connected therewith, but will prevent the return of the lubricant to the casing of the sight-feed.

The tube 37 communicates with a tube 38, which is connected to a supply of steam under pressure and through which the steam flows in the direction of the arrows shown in Fig. 2. A nozzle 39 is placed within the tube 38 in such a position relative to the communication between the tube 37 and the tube 38 that when the steam passes through said nozzle it will tend to produce a vacuum within the tube 37, and therefore act to draw the oil or other lubricant from the tube 37 into the tube 38, where it will be broken up into small particles by contacting with the steam under pressure. This breaking up of the mass of oil or other lubricant as it enters the tube 38 will cause said lubricant to thoroughly mix with the steam and to be carried with said steam through the tube 38, which leads to the cylinder of the engine or to any other place where the steam is to be used as a motive power. This thorough mixing of the lubricant with the steam will thoroughly lubricate the steam and cause it to flow freely within the tubes and passages through which it is to flow in its passage to the cylinder of the engine and will act to lubricate the piston in said cylinder.

By interposing a storage-receptacle within the passage of the lubricant from the reservoir to the place at which it is mixed with the steam I am able to store up a supply of lubricant under pressure and to tap said receptacle at any number of different places, and by means of the valves within the discharge-passages from said storage-receptacle I am able to supply various quantities of the lubricant through these different discharge-passages at the same time. By the use of the relief-passage from the pump-cylinder back to the reservoir containing the lubricant, which passage is controlled by a valve, I am able to maintain substantially a uniform pressure in the storage-receptacle until the full capacity of the pump is reached.

If so desired, I may duplicate the parts of the pump for the lubricant and the connections to the storage-receptacle at the opposite end of the plunger to that already described. By this duplication of the pump I am able to feed the lubricant to the storage-receptacle by the movement of the plunger in both directions, and consequently I am able thereby to double the amount of lubricant pumped to the storage-receptacle, and therefore double the capacity of the lubricator.

By the constant passage of the drops of lubricant through the body of water in the sight-feed a small quantity of the water is carried from said sight-feed by the lubricant, and consequently the level of the water in the sight-feed is gradually lowered. In order to provide means whereby water can easily be supplied to the sight-feed, I provide the sight-feed with a receptacle 40, containing water, which receptacle communicates with the bottom of the casing 31 of the sight-feed, the communication between said receptacle and the casing of the sight-feed being controlled by a valve 41.

When it is desired to supply the sight-feed with water to take the place of that carried away with the lubricant, I open the valve 41, and the action of the nozzle 39 upon the pipe 37 and the space in the top of the sight-feed tending to create a vacuum therein will cause the water in the receptacle 40 to flow into the sight-feed, and therefore raise the level of the water in the sight-feed to the desired height.

Having thus fully described the nature, construction, and the operation of my invention, I wish to secure by Letters Patent and claim as my invention—

1. In a lubricator of a class described, a reservoir to hold a supply of lubricant, a pump-cylinder within said reservoir, a plunger movable within said cylinder, there being an inlet forming communication between the interior of the reservoir and said cylinder, a storage-receptacle for lubricant under pressure, a valved outlet from the pump-cylinder forming communication between the pump-cylinder and the storage-receptacle, means to reciprocate the plunger within the pump-cylinder and thereby force lubricant into the storage-receptacle against the pressure therein, there being a relief-passage forming communication between the inner end of the pump-cylinder and the reservoir of lubricant, an adjustable valve in said relief-passage to adjust the freedom of the flow through said relief-passage and thereby vary the pressure maintained in the storage-receptacle, there being an outlet for the storage-receptacle.

2. In a lubricator of the class described, a reservoir to hold a supply of lubricant, a storage-receptacle to hold lubricant under pressure, there being a connecting-passage between said reservoir and said storage-receptacle, means to force the lubricant from said reservoir into said receptacle against the pressure in said receptacle, there being a plurality of outlet-passages from said storage-receptacle, and an independent adjustable valve controlling each of said outlet-passages, whereby lubricant may be supplied for a plurality of purposes from the same storage-receptacle through said outlet-passages and the amount of lubricant so supplied through each outlet-passage may be adjusted as desired independent of that from the other outlet-passages.

3. In a lubricator for steam, a reservoir to hold a supply of lubricant, there being an outlet-passage from said reservoir, a pump to force the lubricant from the reservoir through the outlet-passage, a storage-receptacle connected to said outlet-passage and into which lubricant is forced under pressure by said pump, there being a relief-passage between the pump-cylinder and said reservoir, an adjustable valve in said relief-passage, there being a plurality of outlets from said storage-receptacle, an adjustable valve controlling each outlet-passage from said storage-receptacle, a pipe connected to a supply of steam under pressure and connected to each outlet from said storage-receptacle, an atomizing-nozzle at the connection of the steam-pipe to each of said outlet-passages, a sight-feed in each outlet-passage from the storage-receptacle intermediate the receptacle and the connection with the steam-pipe, and a check-valve in each outlet-passage from said receptacle intermediate the sight-feed and the connection with the steam-pipe.

In testimony whereof I have affixed my signature in presence of two witnesses.

THOMAS DAVIS.

Witnesses:
HENRY CHADBOURN,
WILLIAM E. WEBSTER.